June 25, 1940.  A. C. DE HOFFMANN  2,205,592
SELF-RELEASING VEHICLE BUMPER
Filed Sept. 2, 1937  2 Sheets-Sheet 2

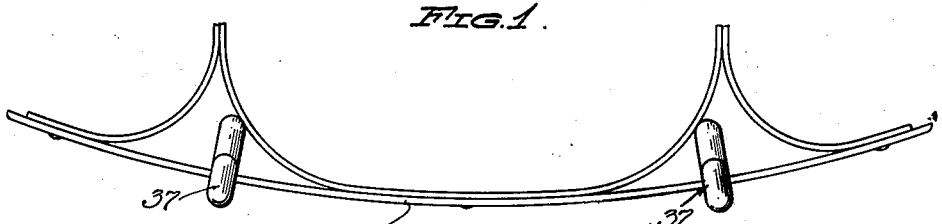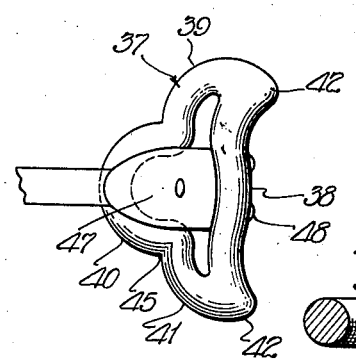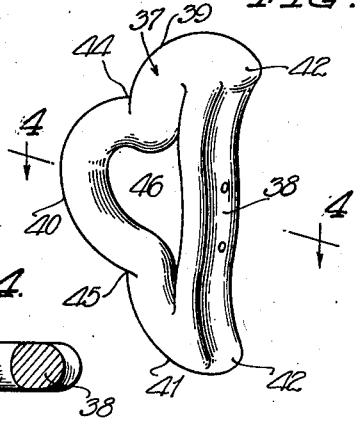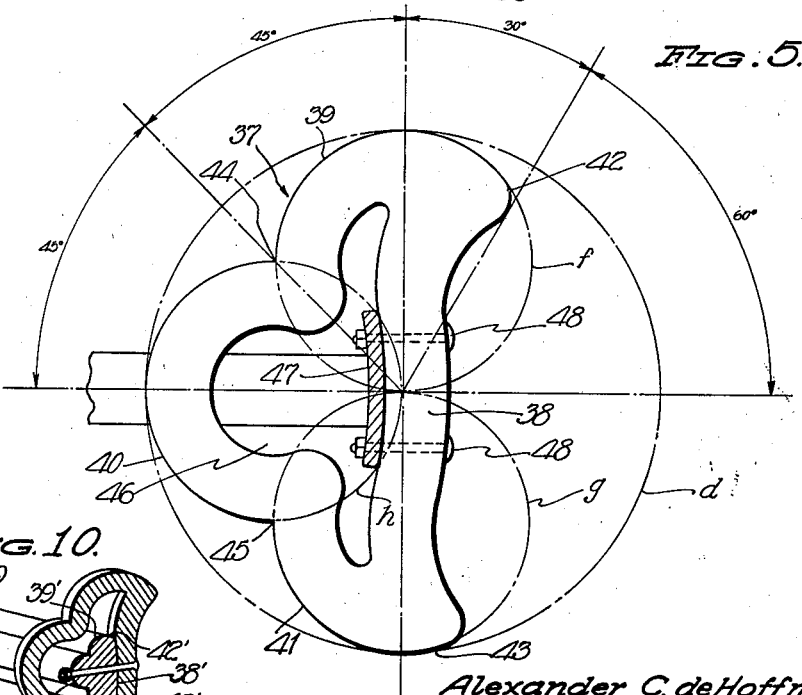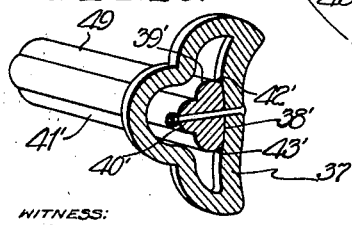

Alexander C. de Hoffmann.
INVENTOR.

WITNESS:

BY
ATTORNEYS.

Patented June 25, 1940

2,205,592

UNITED STATES PATENT OFFICE 2,205,592

SELF-RELEASING VEHICLE BUMPER

Alexander C. de Hoffmann, New York, N. Y.

Application September 2, 1937, Serial No. 162,096

4 Claims. (Cl. 293—55)

This invention relates to improvements in automobile bumpers and more particularly to a self-releasing bumper which is automatically disengageable from entanglement with the bumper of another vehicle, by reason of the motive power of the automobile on which the self-releasing bumper is mounted.

It is a common occurrence for two bumpers of automobiles to become entangled by contact with each other due to traffic congestion or crowded parking conditions or by careless driving. When such entanglement of bumpers occurs, it results in loss of time in effecting a disengagement of the bumpers, traffic tie-up on congested streets and highways, and very often the entangled bumpers become damaged by breakage which entails expense to the automobile owners for repair or replacement of the damaged parts. It is therefore the primary object of this invention to provide an automobile bumper which is self-releasable under the motive power of the automobile on which it is mounted which eliminates the above mentioned difficulties which arise by use of the automobile bumpers of the present conventional construction and design.

Another feature of the invention is the provision of an improved automobile bumper which may be safely released from locked entanglement with the bumper of another automobile by reason of the circle cam principle on which the improved bumper is constructed.

Another feature of the invention resides in a self-releasable automobile bumper which rides free of any entanglement with another bumper by the direct pull exerted thereon when the automobile is placed in motion under its own motive power.

A still further feature of the invention is to provide an automobile bumper having the above features which may be applied to automobiles now in use, as well as newly manufactured cars, and which is simple and inexpensive of construction, and attractive in appearance so as not to detract from the artistic designs of the modern automobile.

With these and other objects in view, the invention resides in the certain novel construction, combination and arrangement of parts, the essential features of which are hereinafter fully described in the following specification, are particularly pointed out in the appended claims, and are illustrated in the accompanying drawings, in which:

Figure 1 is a top plan view of an automobile bumper equipped with a further modified form of bumper releasing attachment.

Figure 2 is an end elevation of the structure shown in Figure 1.

Figure 3 is a detail perspective view of one of the bumper releasing members.

Figure 4 is a horizontal sectional view on the line 4—4 of Figure 3.

Figure 5 is an enlarged sectional side elevational view illustrating the circle principle on which the bumper releasing member is constructed.

Figure 6:
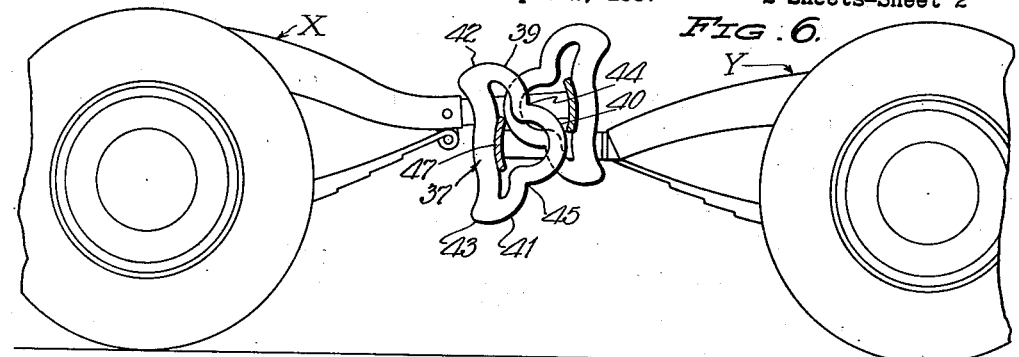

Figures 6 to 9 inclusive are detail sectional side elevational views of the various positions of a pair of bumpers during their period of movement from entangled to disentangled position.

Figure 10 is a sectional perspective view of a combined bumper bar and guard constructed on the self releasing principle.

My invention about to be described is based upon a "circle" principle of curved cam surfaces and by referring to Figure 5, the clover-leaf shape bumperguard attachment 37 is constructed on the principle of four separate circles. Starting with the main circle $d$ which is of a diameter equal to the height of the clover-leaf shape attachment member 37, there is shown upper and lower circles $f$ and $g$ of like diameter whose axes are in vertical alinement with the axis of the lower circle $d$, and a rear circle $h$ whose axis is on the same horizontal plane as the main circle $d$. Whereas, the circle $h$ is of the same diameter as the circles $f$ and $g$, the relative size between these circles may be varied to change the degree of the cam surfaces of the attachment member 37 for reasons hereinafter explained.

The bumper attachment 37 is formed of a single piece of rigid material and includes a front vertical impact portion 38 which may be curved as shown in the drawings, or flat, an upper rearwardly extending cam surface 39, the external curvature of which is an arc of the circle $f$, a rearwardly extending central cam portion 40, the external curvature is an arc of the circle $h$, and a lower rearwardly extending cam surface 41, the external curvature of which is an arc of the circle $g$. Also formed on the arcs of the circles $f$ and $g$ are top and bottom forwardly extending cam lip portions 42 and 43 respectively, either of which is adapted to gradually ease an entangled bumper to final disengagement with a bumper on which the attachment 37 is mounted.

By utilizing the segments of the circles $f$, $g$, and $h$ in determining the curvature of the cam surfaces, there is provided crotches 44 and 45 between the cam surfaces 39 and 40, and between the cam surfaces 40 and 41 respectively, which act as rest shoulders when the attachment 37 is moving over or under an entangled bumper.

In Figure 5 of the drawings, I have illustrated the length by degrees of the upper half (180 degrees) of the main circle d of the various segmental cam surfaces, but the length and curvature of such cam surfaces may be increased or decreased and curved on arcs of circles proportionately different than that herein illustrated.

The bumper attachment 37 is of clover-leaf shape in side elevation and is provided with an opening 46 through which the bumper bar 47 extends. The outer side of the bumper bar 47 fits against the forward side wall of the opening 46 or what is shown in the drawings as the rear side of the vertical impact portion 38. Bolts 48 pass through the portion 38 and bumper bar to rigidly fasten these parts together. Two attachment members 37 are mounted on the bumper bar 47 as illustrated in Figure 1 of the drawings.

Figure 7:
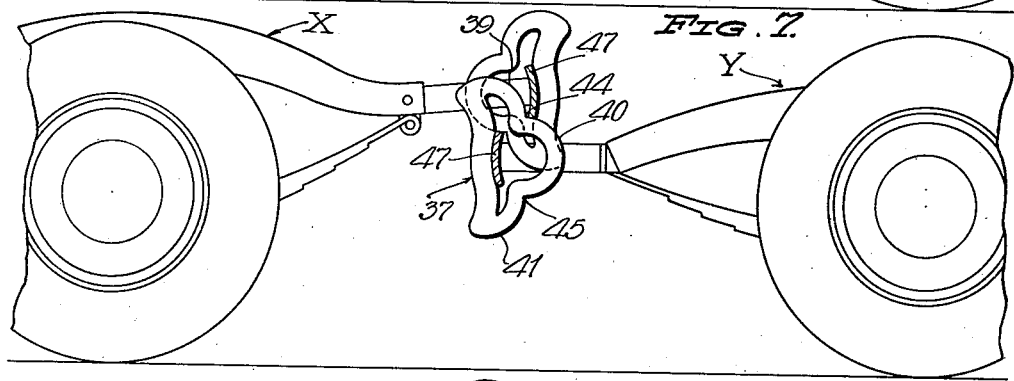
Figure 8:
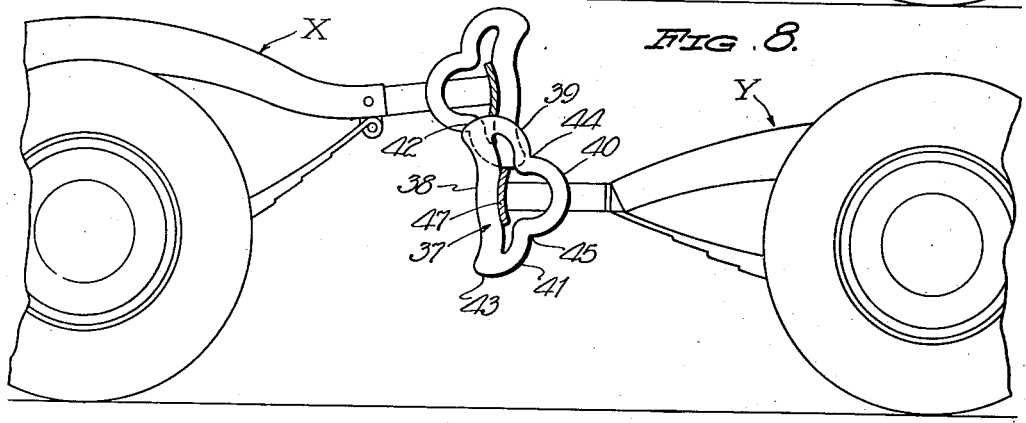
Figure 9:
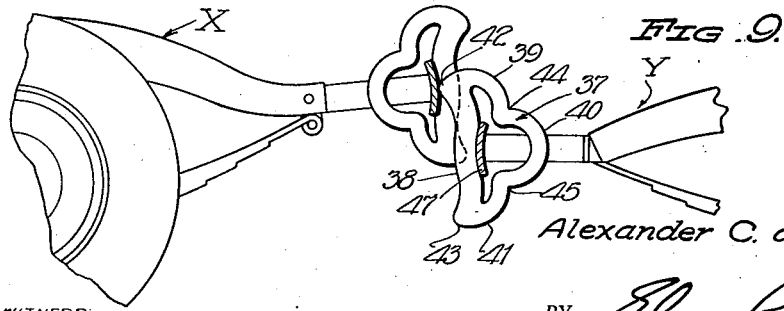

In Figures 6 to 9 of the drawings, I have illustrated the rear of an automobile X and the front of an automobile Y equipped with attachment members 37. In Figure 6 the bumper bars of the automobile X and Y are entangled with the bar 37 of the automobile X disposed behind and overlapping the plane of the bar 47 of the automobile Y. Whereas, both bars 47 are equipped with the attachments 37 and in such case the attachments 37 on both bumper bars coact in effecting disengagement of the entangled bumpers, but the attachments 37 on either of the bumper bars are sufficient to effect disentanglement and for illustration purposes, assume that only the bumper bar 47 of the automobile Y is so equipped. To effect disengagement either or both automobiles may be placed in motion away from each other, whereupon the bumper bar 47 of the automobile X is forced upwardly by its engagement with the upper portion of the curved cam surface 40, of the attachments 37 on the lower bumper bar 47 of the automobile Y. The upper bumper bar 47 comes to rest within the crotch or shoulder 44 and the hurdling operation of the bumper bar is momentarily stopped as seen in Figure 7. Continued relative movement of the automobiles, X and Y, causes the cam surface 39 to further force the upper bumper bar 47 upwardly as shown in Figure 8 which position illustrates the upper bumper bar 47 about to be freed. Further relative movement between the automobiles X and Y permits the upper bumper bar 47 to gradually ride down the forwardly and downwardly curved cam portions or lips 42, as shown in Figure 9, whereupon the bumpers 47 of the automobiles X and Y are completely disentangled. Should the bumper bar 47 of the automobile X be entangled beneath the bumper bar 47 of the automobile Y, the bar 47 of the automobile X will pass over the cam surfaces on the lower half of the attachment members 37 with the same hurdling result of the bumper bars relative to each other.

By reason of the spring suspension of the bodies of the automobiles X and Y, there is a relative yielding movement of the bodies of the automobiles during the riding of the entangled bumper bars over and under each other, thus the wheels of the automobiles remain in tractive engagement with the road.

The outer cam surfaces are round so that there is minimum contacting surfaces between the attachment members and a bumper bar to be disentangled. However, such contacting surfaces on the attachment members may be flat or pointed if desired. Also, while I have illustrated the body of the attaching member as being solid, the same may be made hollow for lightness if desired.

In Figure 10 of the drawings, the principle of the clover leaf shape attachment member 37 is embodied in a bumper bar 49 and is provided with a front impact portion 38', and rounded cam surfaces 39', 40', 41', 42, and 43', which are the equivalent in construction and function as the surfaces 39, 40, 41 and 42 of the attachment member 37. To assure positive bumper protection and disentanglement of locked bumpers under any and all conditions, the bumper bar 49 may also be equipped with attachment members 37.

In view of the varying weights of automobiles and motive power thereof, the rounded cam surfaces on the bumper bar attachment members may be varied proportionately in order to function on minimum power sufficient to effect a disentanglement of a pair of entangled bumper bars. In other words, it should not be necessary for an operator of an automobile to speed up the engine to the maximum to produce a pulling force great enough to cause the bumper attachment to efficiently operate regardless of the weight and horse power of the engine.

While I have shown and described what I consider to be the best embodiments of my invention, I wish it to be understood that such changes and alterations as come within the scope of the appended claims may be resorted to if desired.

Having thus described the invention, what I claim as new and desire to secure by Letters Patent of the United States, is:

1. A disentanglement attachment for motor vehicle bumpers comprising in combination with a bumper bar, an attachment member fixed to said bumper bar and including a body of substantially clover leaf shape in side elevation having round end surfaces and an intermediate round surface, and rest shoulders at the juncture of the intermediate round surface with the round end surfaces substantially as and for the purpose specified.

2. A disentanglement attachment for motor vehicle bumpers comprising a rigid body provided with a central rearwardly projecting curved cam surface, and upper and lower forwardly and rearwardly extending curved cam surfaces contiguous with said central cam surface, all of said cam surfaces being curved on the arcs of circles of different axes, the meeting ends of the curved cam surfaces defining rest shoulders for engagement by an entangled bumper when being cammed over said cammed surfaces.

3. A disentanglement attachment for motor vehicle bumpers comprising a rigid body having a vertical front wall, said body being formed with a central rearwardly projecting curved cam surface, and upper and lower forwardly and rearwardly extending curved cam surfaces contiguous with said central cam surface, the meeting ends of the curved cam surfaces defining rest shoulders all of said cam surfaces being curved on the arcs of circles of different axes, the forwardly extending portions of the upper and lower cam portions being slightly disposed beyond the plane of said front wall.

4. A bumper guard comprising a one-piece body having a bumper bar opening extending transversely therethrough, forwardly and rearwardly extending convex cam surfaces at the top and bottom of said body, an intermediate convex cam surface at the rear of said body meeting the rear ends of the top and bottom cam surfaces, the meeting ends of said intermediate cam surface with the top and bottom cam surfaces defining upper and lower shoulder rests for an entangled bumper when being cammed forwardly over the cam surfaces.

ALEXANDER C. DE HOFFMANN.